US011964861B2

(12) United States Patent
Nishino et al.

(10) Patent No.: US 11,964,861 B2
(45) Date of Patent: Apr. 23, 2024

(54) BEVERAGE SERVER, BEVERAGE SERVER KIT, AND BEVERAGE-POURING METHOD

(71) Applicants: Ryo Nishino, Nagano (JP); NITTOKU CO., LTD., Kodaira (JP)

(72) Inventors: Ryo Nishino, Nagano (JP); Hisaaki Gomi, Kodaira (JP)

(73) Assignees: Ryo Nishino, Kitaadumi (JP); Nittoku Co., Ltd., Tokyo (JP)

(*) Notice: Subject to any disclaimer, the term of this patent is extended or adjusted under 35 U.S.C. 154(b) by 181 days.

(21) Appl. No.: 17/755,880

(22) PCT Filed: Nov. 11, 2020

(86) PCT No.: PCT/JP2020/042000
§ 371 (c)(1),
(2) Date: May 11, 2022

(87) PCT Pub. No.: WO2021/095750
PCT Pub. Date: May 20, 2021

(65) Prior Publication Data

US 2022/0380193 A1 Dec. 1, 2022

(30) Foreign Application Priority Data

Nov. 12, 2019 (JP) ................................ 2019-205004

(51) Int. Cl.
*B67D 1/04* (2006.01)
*B65D 47/06* (2006.01)
(Continued)

(52) U.S. Cl.
CPC ........... *B67D 1/0412* (2013.01); *B65D 47/06* (2013.01); *B67D 1/0807* (2013.01); *B67D 2001/0098* (2013.01)

(58) Field of Classification Search
CPC .... B67D 1/0412; B67D 47/06; B67D 1/0807; B67D 2001/0098
(Continued)

(56) References Cited

U.S. PATENT DOCUMENTS 354,150 A * 12/1886 Jones .................... B65D 45/20 222/91
757,794 A * 4/1904 Walker .................. B65D 47/20 222/91
(Continued)

FOREIGN PATENT DOCUMENTS

JP 4519197 B2 8/2010

*Primary Examiner* — Paul R Durand
*Assistant Examiner* — Michael J. Melaragno
(74) *Attorney, Agent, or Firm* — Muncy, Geissler, Olds & Lowe, P.C.

(57) ABSTRACT

A beverage server for pouring a beverage includes tubular through-screw portion 4, gas supply tube 2, gas supply device 3, gate valve 43, tubular pouring portion 5, and check valve 51. The gate valve is configured to be opened and closed with the pouring portion. The pouring portion has beverage supply hole 53 formed at a lower end portion thereof. Food additive gas supplied from the gas supply device is supplied from the gas supply tube to the through-screw portion and supplied to internal space S through a space between an outer wall of the pouring portion and an inner wall of the through-screw portion. The food additive gas exerts a pressing force that causes the beverage to flow to the inside of the pouring portion through the beverage supply hole, open the check valve, and be poured through an orifice of the pouring portion.

7 Claims, 8 Drawing Sheets

(51) Int. Cl.
*B67D 1/00* (2006.01)
*B67D 1/08* (2006.01)

(58) Field of Classification Search
USPC ........................................................... 222/82
See application file for complete search history.

(56) References Cited

U.S. PATENT DOCUMENTS

| | | | | | |
|---|---|---|---|---|---|
| 1,041,699 | A * | 10/1912 | Thompson, Jr. | 100/108 | |
| 3,227,310 | A * | 1/1966 | Farandatos | B67D 1/04 | 222/518 |
| 4,473,174 | A * | 9/1984 | Heuser | B67D 1/0885 | 215/311 |
| 4,984,711 | A * | 1/1991 | Ellis | B67B 7/26 | 222/400.7 |
| 7,712,637 | B2 * | 5/2010 | Lambrecht | B67D 1/0885 | 141/330 |
| 8,033,431 | B2 * | 10/2011 | Sommerfield | B67D 1/1455 | 222/394 |
| 8,348,097 | B2 * | 1/2013 | Nishino | B67D 3/0032 | 222/113 |
| 8,496,139 | B2 * | 7/2013 | Nishino | B67D 1/0891 | 222/113 |
| 8,939,324 | B2 * | 1/2015 | Azodi | B67D 3/0032 | 222/153.04 |
| 9,139,411 | B2 * | 9/2015 | Rider | B67D 3/0048 | |
| 9,340,403 | B2 * | 5/2016 | Daly | B67D 1/04 | |
| 2005/0178801 | A1 * | 8/2005 | Lambrecht | B67D 1/0885 | 222/399 |
| 2010/0155419 | A1 * | 6/2010 | Nishino | B67D 1/0802 | 222/113 |
| 2013/0119085 | A1 * | 5/2013 | Nishino | B67D 3/0032 | 222/164 |
| 2013/0292423 | A1 * | 11/2013 | Lambrecht | B67D 1/0809 | 222/83.5 |
| 2022/0380193 | A1 * | 12/2022 | Nishino | B67D 1/0885 | |

* cited by examiner

BEVERAGE SERVER, BEVERAGE SERVER KIT, AND BEVERAGE-POURING METHOD

TECHNICAL FIELD

The present invention relates to beverage servers, beverage server kits, and beverage-pouring methods that make it possible to pour beverages out of bottles to which cork stoppers have been attached and, more particularly, to a beverage server, a beverage server kit, and a beverage-pouring method that make it possible to pour a beverage without exposing the beverage to outside air and that are suitable to storage in a case where the pouring is interrupted.

BACKGROUND ART

In the fields of beverages, particularly wine, bottles sealed with cork stoppers attached thereto are widely used. Once wine is exposed to outside air by taking a cork stopper out, deterioration of a remnant of the wine in a bottle progresses even when the bottle is sealed again with the cork stopper later. Accordingly, there is demand for a tool that is used for pouring wine without exposing the wine to outside air so that drinking the wine, whose flavor counts, may be enjoyed.

For this purpose, a beverage server that is used in a bottle is under development. For example, a beverage server system of PTL 1 includes a through portion that passes completely through a cork. The through portion has a beverage-pouring path through which a beverage is poured out of a bottle and a gas-injection path through which a gas is injected into the bottle. The through portion has a double-tube structure in which the beverage-pouring path is contained in the gas-injection path. The beverage-pouring path is configured to move along the gas-injection path so that the amount by which the beverage-pouring path protrudes from the gas-injection path varies. When the beverage-pouring path is moved in such a direction that the amount by which the beverage-pouring path protrudes from the gas-injection path increases, the gas-injection port opens.

CITATION LIST

Patent Literature

PTL 1: Japanese Patent No. 4519197

SUMMARY OF INVENTION

Technical Problem

The beverage server system of PTL 1 lets outside air into a bottle when the beverage server system is detached from the bottle after the beverage server system has been attached to the bottle. Therefore, the beverage server system needs to be kept attached to the bottle to keep the quality of a remnant of the beverage in the bottle. Accordingly, the beverage server system needs to be attached to the bottle even in a case where pouring is interrupted, and during the interruption, the beverage server system cannot be used in another bottle, which causes inconvenience.

Further, the beverage server system is so bulky that there are great space limitations during storage.

The present invention was developed in response to the aforementioned problems. That is, the present invention has as an object to provide a beverage server, a beverage server kit, and a beverage-pouring method that make it possible to pour a beverage while avoiding as much as possible exposing the beverage to outside air and that are suitable to storage in a case where the pouring is interrupted.

Solution to Problems

As a result of diligent study, the inventor of the present invention found that the aforementioned problems can be solved by attaching a gate valve to the inside of a through-screw portion configured to pass completely through a cork stopper and configuring the gate valve to be opened by inserting a pouring portion in pouring a beverage and to be closed by pulling out the pouring portion in not pouring the beverage. The present invention is based on these findings.

The present invention is directed to (1) a beverage server for pouring a beverage stored in an internal space of a bottle to which a cork stopper has been attached, the beverage server including: a tubular through-screw portion that is attached by boring through the cork stopper; a gas supply tube communicating with an inside of the through-screw portion; a gas supply device attached to the gas supply tube and configured to supply a food additive gas to the gas supply tube; a gate valve attached to the inside of the through-screw portion; a tubular pouring portion, inserted in the through-screw portion, that passes through the gate valve; and a check valve attached to an inside of the pouring portion, wherein the gate valve is configured to be opened by passing the pouring portion through the gate valve and to be closed by pulling the pouring portion out of the gate valve, the pouring portion has a beverage supply hole formed at a lower end portion thereof, the food additive gas supplied from the gas supply device is supplied from the gas supply tube to the through-screw portion and supplied to the internal space through a space between an outer wall of the pouring portion and an inner wall of the through-screw portion, and the food additive gas supplied to the internal space exerts a pressing force that causes the beverage to flow to the inside of the pouring portion through the beverage supply hole, open the check valve, and be poured through an orifice of the pouring portion.

The present invention is directed to (2) the beverage server according to (1) wherein the gate valve is substantially in a shape of a disk having flexibility, the gate valve has a slit portion provided in substantially a center thereof, and the gate valve is opened by a gap portion being formed between the pouring portion and the gate valve by passing the pouring portion through the slit portion.

The present invention is directed to (3) the beverage server according to (1) or (2), wherein the through-screw portion has provided at a lower end portion thereof a notch portion configured to bore through the cork stopper.

The present invention is directed to (4) the beverage server according to any one of (1) to (3), further including a casing portion, wherein the casing portion includes an interconnecting portion to which the gas supply tube and the through-screw portion have been attached, and a housing portion containing the interconnecting portion and the gas supply tube, the interconnecting portion includes a hollow portion communicating with an inside of the gas supply tube and the inside of the through-screw portion, the housing portion is provided with a connecting port, connected with the gas supply tube, to which the gas supply device is connected, and the food additive gas supplied from the gas supply device is supplied to the through-screw portion via the hollow portion from the gas supply tube.

The present invention is directed to (5) the beverage server according to any one of (1) to (4), wherein the through-screw portion is configured to be detachably attached to the casing portion, and the housing portion has a lock mechanism that fastens the through-screw portion.

The present invention is directed to (6) a beverage server kit including: the beverage server according to (4) or (5); a tubular guide portion that is attached to the casing portion instead of the pouring portion in order to bore through the cork stopper in attaching the beverage server to the cork stopper; and a cap portion configured to, in interrupting pouring of the beverage, seal the inside of the through-screw portion separated from the casing portion, wherein the cap portion is attachable to and detachable from the through-screw portion, the guide portion is provided with a guide portion check valve, the guide portion has provided at a lower end portion thereof a screw portion configured to bore through the cork stopper, and the guide portion has a gas supply hole provided at the lower end portion.

The present invention is directed to (7) a beverage-pouring method involving use of the beverage server kit according to (6), the beverage-pouring method including: a temporary passing step of passing the through-screw portion halfway through the cork stopper by handling the casing portion with the guide portion attached to the casing portion; a substituting step of substituting air inside the gas supply tube, the through-screw portion, and the guide portion with the food additive gas by supplying the food additive gas from the gas supply device; a passing step of passing the through-screw portion completely through the cork stopper; a temporary inserting step of, after detaching the guide portion from the casing portion, inserting the pouring portion into the body portion until a lower end of the pouring portion reaches the hollow portion; a resubstituting step of substituting air in the pouring portion with the food additive gas by supplying the food additive gas from the gas supply device; an attaching step of attaching the pouring portion to the casing portion by passing the pouring portion through the gate valve and inserting the pouring portion into the through-screw portion until the beverage supply hole reaches the beverage; and a pouring step of pouring the beverage through the poring portion by supplying the food additive gas from the gas supply device to the internal space via the gas supply tube.

Advantageous Effects of Invention

The beverage server includes a gate valve attached to the inside of the through-screw portion, and the gate valve is configured to be opened by passing the pouring portion through the gate valve. The supply of the food additive gas to the internal space by the gas supply device makes it possible to pour the beverage out of the bottle without exposing the beverage to outside air.

Further, in a state in which the pouring portion is not passed through the gate valve, i.e. a state in which the pouring portion has been pulled out of the through-screw portion, the gate valve is closed. Therefore, exposure of the beverage to outside air can be prevented as much as possible even when the pouring portion is pulled out of the through-screw portion. This makes it possible to store the bottle with the pouring portion pulled out of the bottle, making it possible to save space without bulkiness.

In the beverage server, the gate valve has flexibility, and the gate valve is provided with a slit portion. Passage of the pouring portion through the gate valve via the slit portion forms a gap portion as a narrow gap in a part of the slit portion in which the gate vale does not touch the pouring portion. The food additive gas can be supplied via the gap portion. This makes it possible to, in pouring the beverage, prevent the beverage as much as possible from being exposed to outside air.

Further, since the gate valve has flexibility and the gap portion is a narrow gap, the gate valve becomes instantly closed in a case where the pouring portion has been pulled out of the slit portion. This makes it possible to seal the bottle with a simple configuration and prevent the beverage as much as possible from being exposed to outside air.

In the beverage server, the through-screw portion has provided at a lower end portion thereof a notch portion configured to bore through the cork stopper. This makes it possible to easily open the cork stopper with the through-screw portion in attaching the beverage server to the cork stopper.

In the beverage server, since the interconnecting portion of the casing portion has the hollow portion, the pouring portion can be passed through the through-screw portion via the hollow portion. The food additive gas supplied from the gas supply device can be guided to the inside of the through-screw portion via the hollow portion. This makes it possible to surely introduce the food additive gas into the internal space to press the beverage.

Further, including the casing portion makes it possible to easily attach the through-screw portion to the cork stopper by handling the casing portion.

In the beverage server, detachable attachment of the through-screw portion to the casing portion makes it possible to, in interrupting the pouring of the beverage, more compactly store the bottle with the through-screw portion and the casing portion detached from the bottle.

Further, the housing portion has a lock mechanism that fastens the through-screw portion. This makes it possible to stably pour the beverage in resuming the pouring of the beverage, as the through-screw portion is surely fastened to the casing portion.

In the beverage server kit, including a tubular guide portion that is attached to the casing portion instead of the pouring portion makes handling easy in passing the through-screw portion completely through the cork stopper.

Furthermore, since the guide portion has provided at a lower end portion thereof a screw portion configured to bore through the cork stopper, the through-screw portion can be easily passed completely through the cork stopper.

Further, including the cap portion makes it possible to double-seal the bottle with the cap portion in closing the gate valve. This makes it possible to surely seal the bottle in interrupting the pouring of the beverage and storing the bottle. This also makes it possible to store the bottle in a lying position, making it possible to save space.

Since the beverage-pouring method includes the temporary passing step of passing the through-screw portion halfway through the cork stopper with the guide portion inserted the through-screw portion and the passing step of passing the through-screw portion completely through the cork stopper, the through-screw portion can be easily passed completely through the cork stopper.

Further, including the substituting step of substituting air in the guide portion and the through-screw portion with the food additive gas and the resubstituting step of substituting air in the pouring portion with the food additive gas makes it possible to prevent the beverage as much as possible from being exposed to outside air without entry of outside air into the bottle.

Furthermore, pouring the beverage by supplying the food additive gas from the gas supply portion into the bottle makes it possible to pour the beverage without exposing the beverage to outside air, making it possible to prevent lees as much as possible from being stirred up.

DESCRIPTION OF EMBODIMENTS

Figure 1:
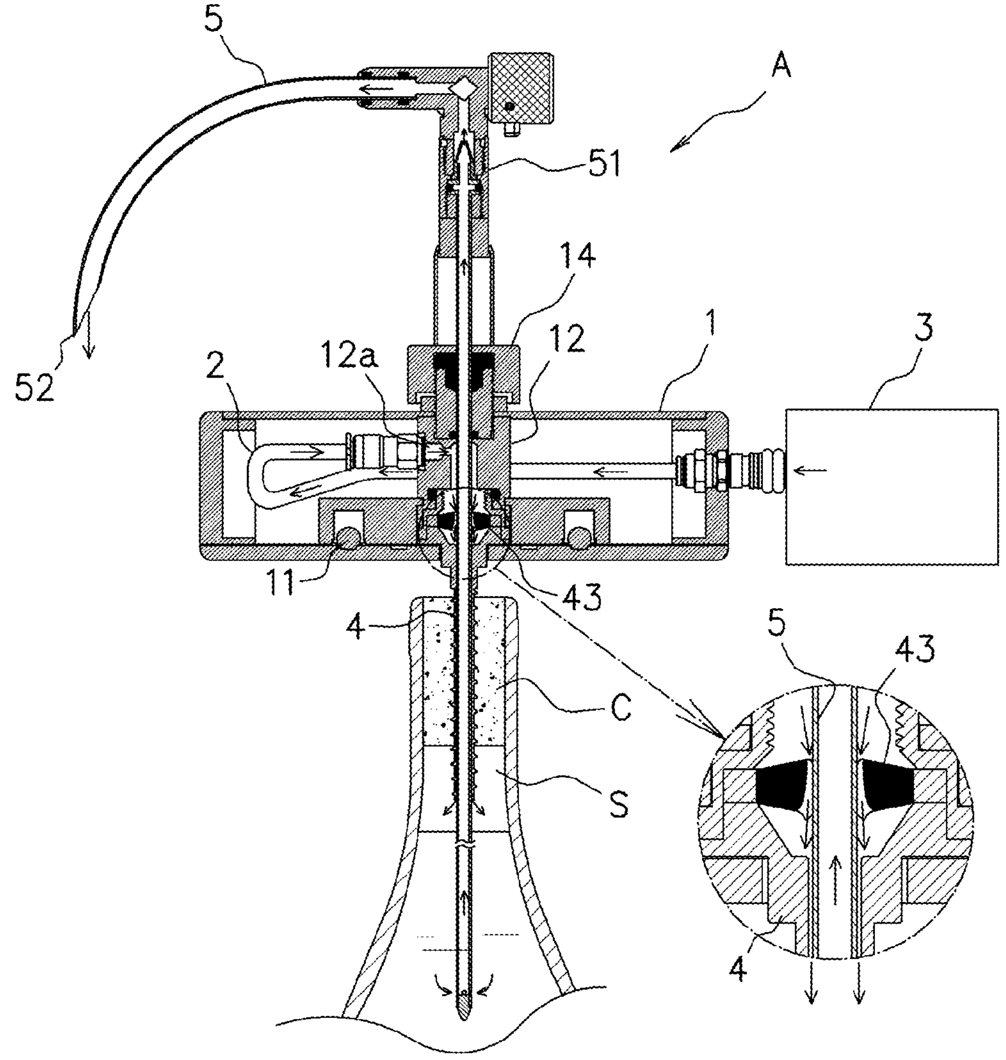
FIG. 1 is a cross-sectional view of a beverage server.

The following describes a preferred embodiment of the present invention in detail with reference to the drawings as needed.

In the drawings, identical elements are assigned identical signs, and a repeated description is omitted.

Further, positional relationships such as "up", "down", "right", and "left" are based on positional relationships shown in the drawings, unless otherwise noted. Furthermore, the ratios of dimensions in the drawings are not limited to the ratios illustrated.

FIG. 1 is a partially-enlarged cross-sectional view of a beverage server A. Further, arrows in the drawing indicate directions in which a food additive gas and a beverage flow.

The beverage server A of the present invention is a beverage server A configured to pour a beverage stored in an internal space S of a bottle to which a cork stopper C has been attached.

The beverage server A includes a tubular through-screw portion 4 that is attached by boring through the cork stopper C, a gas supply tube 2 communicating with the inside of the through-screw portion 4, a gas supply device 3 attached to the gas supply tube 2 and configured to supply a food additive gas to the gas supply tube 2, a gate valve 43 attached to the inside of the through-screw portion 4, a tubular pouring portion 5, inserted in the through-screw portion 4, that passes through the gate valve 43, a check valve 51 attached to the inside of the pouring portion 5, and a casing portion 1.

The casing portion 1 is a hollow casing and has a housing portion containing the gas supply tube 2 and an interconnecting portion 12 to which the gas supply tube 2 and the through-screw portion 4 have been attached.

The housing portion is an outer wall of the casing portion 1 and includes the interconnecting portion 12 inside. The housing portion has provided on a lower side thereof a lock mechanism 11 configured to fasten the through-screw portion 4 to the casing portion 1.

The gas supply tube 2 is connected with a connection port 13 provided in a side surface of the housing portion, and the inside of the gas supply tube 2 communicates with a hollow portion 12*a*.

The interconnecting portion 12 is a cylindrical member provided in the middle of the inside of the housing portion 1 and has provided inside thereof the hollow portion 12*a*, which is a hollow space.

The hollow portion 12*a* has its upper end opening toward the outside of the casing portion 1, and in the opening, a receiving portion 14 serving as a gasket is provided to seal the hollow portion 12*a*.

The hollow portion 12*a* has its lower end opening, and the through-screw portion 4 is detachably attached to the lower end from below the casing portion 1, so that the hollow portion 12*a* and the inside of the through-screw portion 4 communicate with each other. This allows the pouring portion 5 to pass completely through to the through-screw portion 4 via the hollow portion 12*a*.

Since the casing portion 1 has the interconnecting portion 12 and the interconnecting portion 12 has the hollow portion 12*a*, a food additive gas supplied from the after-mentioned gas supply device 3 can be guided to the inside of the through-screw portion 4. This makes it possible to surely introduce the food additive gas into the internal space S to press the beverage.

Figure 2:
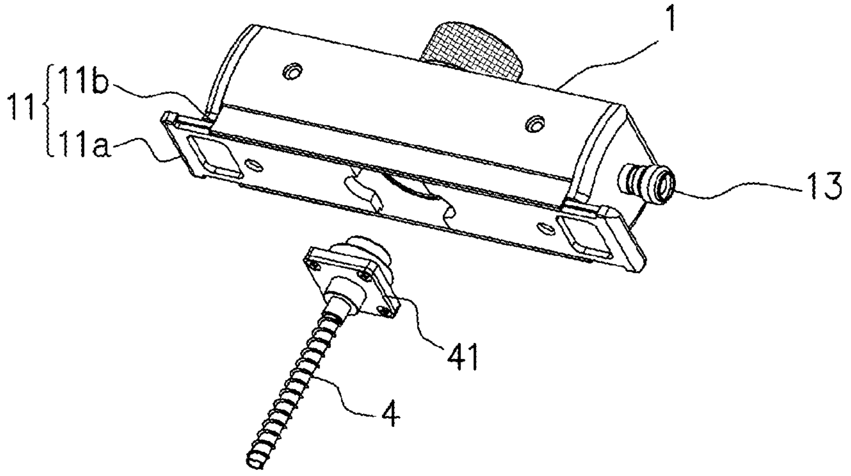
FIG. 2 is a perspective view showing a lock mechanism.

FIG. 2 is a perspective view showing the lock mechanism 11.

The lock mechanism 11 includes a groove portion 11*b* provided on a lower side of the casing portion 1 and a pair of lid portions 11*a* configured to slide along the groove portion 11*b*. The lid portions 11*a* slide and sandwich the through-screw portion 4 from both sides, whereby the through-screw portion 4 is fastened to the casing portion 1. In a case where the through-screw portion 4 is detached, the through-screw portion 4 is rendered detachable by sliding the lock mechanism 11 into an open position.

The inclusion of the lock mechanism 11 by the housing portion allows the through-screw portion 4 to be surely fastened to the casing portion 1, making it possible to stably pour the beverage. Further, at the time of attachment of the beverage server A to the cork stopper C, the beverage server A can be easily attached to the cork stopper C by rotating the casing portion 1.

Further, detachable attachment of the through-screw portion 4 to the casing portion 1 makes it possible to, in interrupting the pouring of the beverage, more compactly store the bottle with the through-screw portion 4 and the casing portion 1 detached from the bottle.

Figure 3:
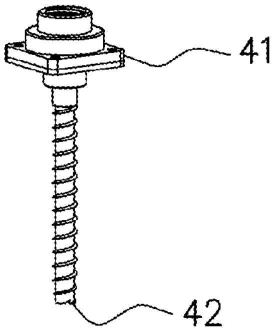
FIG. 3 is a perspective view showing a through-screw portion.

FIG. 3 is a perspective view showing the through-screw portion 4.

The through-screw portion 4 is in the form of a tube, and is longer than the cork stopper C. The through-screw portion 4 has its outer surface threaded as a screw to open the cork stopper C. The through-screw portion 4 has provided at a lower end thereof a notch portion 42 configured to bore through the cork stopper C. The notch portion 42 is a V-shaped notch having a thin-walled terminal. This makes it possible to bore through the cork stopper C by rotating the through-screw portion 4 with respect to the cork stopper C to cause the notch portion 42 to cut into the cork stopper C. This in turn makes it possible to easily open the cork stopper C in attaching the beverage server A to the cork stopper C.

The through-screw portion 4 has provided on an outer surface of an upper end portion thereof a wide flange portion 41 configured to be fastened by the lock mechanism 11. When the lock mechanism 11 has been closed by attaching the through-screw portion 4 to the casing portion 1, the flange portion 41 engages with the lock mechanism 11, whereby the through-screw portion 4 is fastened to the casing portion 1.

Further, the gate valve 43 is provided inside of the through-screw portion 4.

Figure 4:
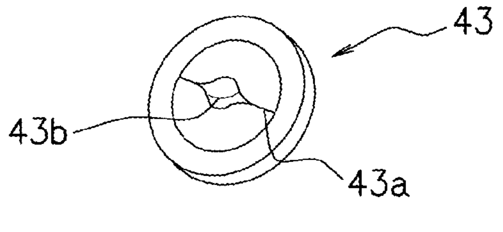
FIG. 4 is a perspective view showing a gate valve.

FIG. 4 is a perspective view showing the gate valve 43.

The gate valve 43 is in the shape of a disk whose upper and lower surfaces are raised in substantially the center, and is provided with a slit portion 43*a* passing vertically through substantially the center in a linear fashion in top view. The slit portion 43*a* is normally in a closed state, so that the gate valve 43 is in a closed state. When the pouring portion 5 is passed through the slit portion 43*a*, the slit portion 43*a* opens. This forms a gap portion 43*b* as a narrow gap between the pouring portion 5 and the slit portion 43*a*, so that the gate valve 43 opens. As will be mentioned later, the food additive gas can be supplied to the internal space S via the gap portion 43*b*. This makes it possible to, in pouring the beverage, prevent the beverage as much as possible from being exposed to outside air.

Further, pulling the pouring portion 5 out of the slit portion 43*a* causes the slit portion 43*a* to close due to the flexibility of the gate valve 43, so that the gap portion 43*b*, which is a narrow gap, becomes instantly closed. This causes the gate valve 43 to become instantly closed. This makes it possible to seal the bottle with a simple configuration and prevent the beverage as much as possible from being exposed to outside air. This also makes it possible to, in interrupting the pouring and storing the bottle, save space without bulkiness by pulling out the pouring portion 5 out of the gate valve 43.

The gate valve 43 can be suitably made of a material such as flexible synthetic resin. In particular, a material such as fluorocarbon rubber or nitrile rubber are preferred. In this case, the gate valve 43 smoothly deforms, so that the opening of the gate valve in a case where the pouring portion 5 has been passed through the slit portion 43*a* and the closing of the gate valve in a case where the pouring portion 5 has been pulled out of the slit portion 43*a* can be surely carried out.

The gas supply tube 2 is a flexible tube that connects the interconnecting portion 12 from the connecting portion 13 of the casing portion 1. The gas supply tube 2 allows the connecting port 13 and the hollow portion 12*a* of the interconnecting portion 12 to communicate with each other.

The gas supply device 3 is connected to the connecting port 13 of the casing portion 1. The gas supply device 3 functions to supply a food additive gas stored inside to the inside of the gas supply tube 2 via the connecting port 13.

Examples of the food additive gas include nitrogen, carbon dioxide, and nitrous oxide.

As the gas supply device 3, a publicly-known gas cylinder or other devices can be used. In this case, the gas supply device 3 can be easily replaced with another one.

Figure 5:
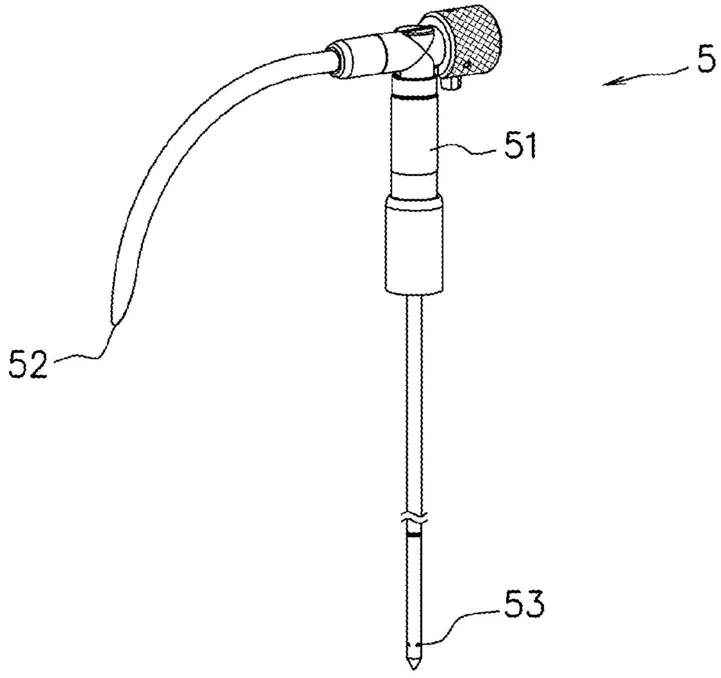
FIG. 5 is a cross-sectional view showing a pouring portion.

FIG. 5 is a cross-sectional view showing the pouring portion 5.

The pouring portion 5 is in the form of a tube, and has a linear portion that is longer than the length of the bottle and a tip bent so that the beverage can be poured. The pouring portion 5 has a beverage supply hole 53 provided in a side wall at a lower end portion thereof. Further, the pouring portion 5 has an orifice 52, provided in a bent tip portion at the other end, through which the beverage is poured.

The pouring portion 5 has a check valve 51 provided inside thereof.

The pouring portion 5 is attached to the casing portion 1 for use. In a case where the pouring portion 5 is attached to the casing portion 1, the pouring portion 5 is passed through the receiving portion 14 of the casing portion 1. The receiving portion 14 has attached to the inside thereof an O-ring serving as a gasket. Therefore, in a case where the pouring portion 5 has been passed, the hollow portion 12*a* is sealed. When the pouring portion 5 is further passed, a tip of the pouring portion 5 enters the inside of the through-screw portion 4 through the hollow portion 12*a*. When the tip of the pouring portion 5 is further passed through the slit portion 43*a* of the gate valve 43 provided inside of the through-screw portion 4, the gap portion 43*a* is formed, whereby the gate valve 43 opens.

A beverage server kit further includes a guide portion 6 and a cap portion 7.

Figure 6:
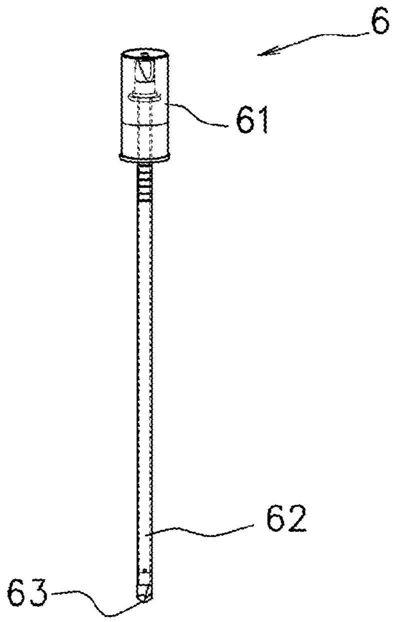
FIG. 6 is a cross-sectional view showing a guide portion.

FIG. 6 is a cross-sectional view showing the guide portion 6.

The guide portion 6 is in the form of a tube, and has a guide portion check valve 61 provided inside thereof. The guide portion 6 has a screw portion 63 provided at a lower end portion thereof so that the cork stopper C can be bored through. Further, the guide portion 6 has a gas supply hole 62 provided in a side wall at the lower end portion.

The inclusion of the screw portion 63 by the guide portion 6 makes it possible to, in passing the through-screw portion 4 completely through the cork stopper C, easily bore through the cork stopper C with the guide portion 6 attached to the through-screw portion 4.

The guide portion 6 is substantially equal in diameter to the pouring portion 5, and can be attached to the casing portion 1 instead of the pouring portion 5. In a case where the guide portion 6 is attached to the casing portion 1, the guide portion 6 is passed through the receiving portion 14 and then passed through the slit portion 43*a* of the gate valve 43 via the hollow portion 12*a*.

Figure 7:
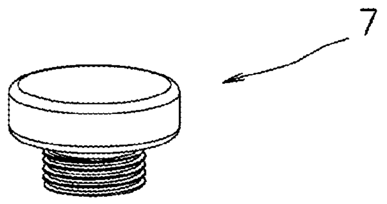
FIG. 7 is a perspective view showing a cap portion.

FIG. 7 is a perspective view showing the cap portion 7.

The cap portion 7 is detachably provided at an upper end of the through-screw portion 4.

The through-screw portion 4 has an upper portion whose inside diameter is threaded so as to be screwed to a small-diameter portion of the cap portion 7, and the small-diameter portion of the cap portion 7 is threaded accordingly.

Screwing the cap portion 7 to the upper end of the through-screw portion 4 after the casing portion 1 has been detached makes it possible to seal the inside of the through-screw portion 4.

Including the cap portion 7 makes it possible to double-seal the bottle with the cap portion 7 in closing the gate valve 43. This makes it possible to surely seal the bottle in interrupting the pouring of the beverage and storing the bottle. This also makes it possible to store the bottle in a lying position, making it possible to save space.

The following describes a beverage-pouring method involving the use of the beverage server kit of the present invention.

Figure 8:
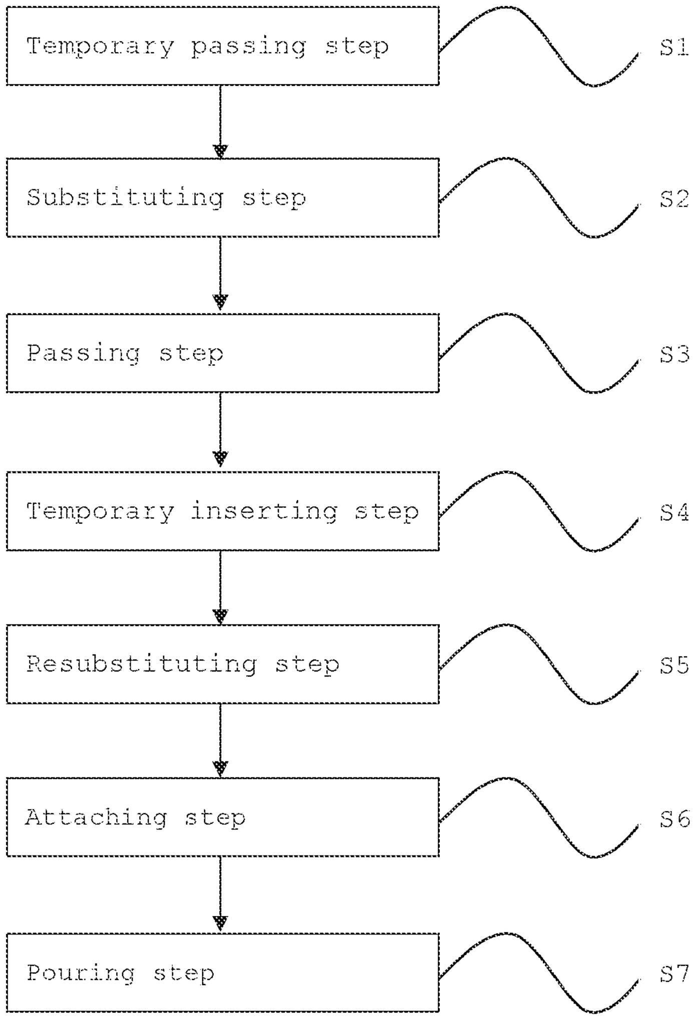
FIG. 8 is a block diagram showing a beverage-pouring method.

FIG. 8 is a block diagram showing the beverage-pouring method.

First, the beverage server A is attached to a bottle, sealed with the cork stopper C, in which a beverage is stored. The beverage server A is used with the through-screw portion 4 fastened to the casing portion 1 and the guide portion 6 attached to the casing portion 1.

In a temporary passing step S1, the guide portion 6 is attached by being passed through the receiving portion 14 of the casing portion 1 with the through-screw portion 4 attached to the casing portion 1. The guide portion 6 passes through the gate valve 43 provided inside of the through-screw portion 4, and the screw portion 63 provided at a tip of the guide portion 6 is brought into such a state that the through-screw portion 4 is exposed. Further, since the guide portion 6 is passed through the gate valve 43, the gate valve 43 is in an open state with the gap portion 43*b* formed.

In this state, the casing portion 1 is rotated with respect to the cork stopper C to bore halfway through the cork stopper C with the screw portion 63 and the notch portion 42. That is, the through-screw portion 4 bores incompletely through the cork stopper C.

Since the guide portion 6 is shorter than the pouring portion 5, it is possible to easily carry out the task of boring through the cork stopper C by rotating the casing portion 1 with the guide portion 6 attached to the casing portion 1.

In a substituting step S2, a food additive gas is supplied from the gas supply device 3. The food additive gas flows into the gas supply tube 2 through the connecting portion 13, and is supplied to the inside of the through-screw portion 4 via the hollow portion 12*a*. At this point in time, the gate valve 43 opens with the gap portion 43*b* formed; therefore, the food additive gas passes between an inner wall of the through-screw portion 4 and an outer wall of the guide portion 6, and is supplied to the inside of the guide portion 6 through the gas supply hole 62 provided at the lower end portion of the guide portion 6.

This causes outside air inside of the gas supply tube 2, the hollow portion 12*a*, the through-screw portion 4, and the guide portion 6 to be substituted with the food additive gas.

Since the guide portion check valve 61 is provided inside of the guide portion 6, the inflow of outside air into the guide portion 6 or to the inside of the through-screw portion 4, which communicates with the guide portion 6, can be prevented as much as possible even in a case where the supply of the food additive gas has been interrupted.

In the passing step S3, the casing portion 1 is rotated again with respect to the cork stopper C, whereby the cork stopper C is bored through to the lower end by the screw portion 63 and the notch portion 42. This brings the through-screw portion 4 into a state of passing completely through the cork stopper C.

Since the guide portion 6 is shorter than the pouring portion 5, it is possible to easily carry out the task of boring through the cork stopper C by rotating the casing portion 1 with the guide portion 6 attached to the casing portion 1.

In a temporary inserting step S4, the guide portion 6 is pulled out of the casing portion 1. In this case, the gate valve 43 becomes closed by the guide portion 6 being pulled out. Further, the hollow portion 12*a* becomes sealed with the receiving portion 14. Accordingly, even in a case where the guide portion 6 has been pulled out, the inflow of outside air to the inside of the through-screw portion 4 and into the internal space S can be prevented.

The pouring portion 5 is passed through the receiving portion 14 of the casing portion 1 after the guide portion 6 has been pulled out. The pouring portion 5 is further inserted and brought into such a state that the tip of the pouring portion 5 stays in the hollow portion 12*a* and does not pass through the gate valve 43. The pouring portion 5 is provided with a mark so that the pouring portion 5 can be passed by an appropriate length.

At this point in time, the hollow portion 12*a* is sealed with the receiving portion 14. Further, the gate valve 43 becomes closed.

In a resubstituting step S5, the food additive gas is supplied again from the gas supply device 3. The food additive gas passes through the gas supply tube 2 and the hollow portion 12, and is supplied to the inside of the pouring portion 5 through the beverage supply hole 53. This causes outside air inside the pouring portion 5 to be discharged outward through the orifice 52 of the pouring portion 5 and substituted with the food additive gas. Further, even in a case where outside air slightly has flowed into the hollow portion 12*a* or the gas supply tube 2 when the guide portion 6 and the pouring portion 5 are attached and detached, the outside air can be substituted with the food additive gas in the resubstituting step S5.

Since the check valve 51 is provided inside of the pouring portion 5, the inflow of outside air to the inside of the pouring portion 5 can be prevented as much as possible even in a case where the supply of the food additive gas has been interrupted.

In an attaching step S6, the pouring portion 5 is further inserted into the casing portion 1, passed through the gate valve 43, and inserted until the pouring portion 5 reaches the bottom of the bottle. This brings the beverage supply hole 53 into a state of being immersed in the beverage. Further, the gate valve 43 is brought into an open state with the gap portion 43*b* formed by the pouring portion 5 being passed through the slit portion 43*a*.

In a pouring step S7, the food additive gas is supplied from the gas supply device 3. The food additive gas is supplied to the internal space S via the connecting port 13, the gas supply tube 2, the hollow portion 12*a*, and the space between the inner wall of the through-screw portion 4 and an outer wall of the pouring portion 5. The food additive gas supplied to the internal space S presses the beverage, whereby the beverage flows to the inside of the pouring portion 5 through the beverage supply hole 53 of the pouring portion 5 and is poured through the orifice 52.

Since the check valve 51 is provided inside of the pouring portion 5, outside air does not flow to the inside of the pouring portion 5 or touch the beverage even in a case where the supply of the food additive gas has been interrupted. This makes it possible to prevent lees as much as possible from being stirred up.

In a case where the pouring of the beverage is interrupted, the pouring portion 5 is pulled out from the casing portion 1 and the through-screw portion 4. At this point in time, the gate valve 43 becomes closed by the pouring portion 5 being pulled out of the through-screw portion 4. Further, the hollow portion 12*a* becomes sealed with the receiving portion 14. Furthermore, the lid portion 11*a* of the lock mechanism 11 is opened, and the casing portion 1 is removed from the through-screw portion 4. This brings about such a state that only the through-screw portion 4 remains in the cork stopper C, and the internal space S and outside air are blocked from each other by the gate valve 43.

Furthermore, attaching the cap portion 7 to the through-screw portion 4 allows the internal space S and outside air to be more surely blocked from each other. In this state, the bottle can be stored in a lying position, so that space can be saved.

In pouring the beverage again, the casing portion 1 is attached to the through-screw portion 4 after the cap portion 7 has been detached from the through-screw portion 4, and furthermore, the pouring portion 5 is passed through the receiving portion 14 to be attached to the casing portion 1. In this state, the aforementioned procedure is repeated, starting from the temporary inserting step S4.

This makes it possible to extract the beverage without exposing the beverage to outside air.

While the foregoing has described a preferred embodiment of the present invention, the present invention is not limited to the foregoing embodiment.

Although, in the present embodiment, the beverage server A includes a casing portion 1 containing a gas supply tube 2, this configuration is not essential. By configuring the pouring portion 5 to be inserted into a sealed gas supply tube 2 and pass through the through-screw portion 4, the beverage can be poured without being exposed to outside air.

Although, in the present embodiment, the gate valve 43 is in the shape of a disk whose upper and lower surfaces are raised in substantially the center, this shape is not intended to impose any limitation. Further, the size and thickness of the gate valve 43, the size or other features of the slit portion may be adjusted as appropriate.

Although, in the present embodiment, the beverage server kit includes a guide portion 6, this configuration is not essential. Providing the screw portion 63 at the tip of the pouring portion 5 makes it possible to bore through the cork stopper C with the pouring portion 5 attached to the through-screw portion 4.

In this case, it becomes possible to omit the temporary substituting step S2.

INDUSTRIAL APPLICABILITY

The beverage server A, the beverage server kit, and the beverage-pouring method can be widely used in a case where a beverage stored in a bottle is extracted without being exposed to outside air.

REFERENCE SIGNS LIST

A . . . beverage server,
1 . . . casing portion,
11 . . . lock mechanism,
11*a* . . . lid portion,
11*b* . . . groove portion,
12 . . . interconnecting portion,
12*a* . . . hollow portion,
13 . . . connecting port,
14 . . . receiving portion,
2 . . . gas supply tube,
3 . . . gas supply device,
4 . . . through-screw portion,
41 . . . flanged portion
42 . . . notch portion,
43 . . . gate valve,
43*a* . . . slit portion,
43*b* . . . gap portion,
5 . . . pouring portion,
51 . . . check valve,
52 . . . orifice,
53 . . . beverage supply hole,
6 . . . guide portion,
61 . . . guide portion check valve,
62 . . . gas supply hole,
63 . . . screw portion,
7 . . . cap portion,
S . . . internal space,
C . . . cork stopper,
S1 . . . temporary passing step,
S2 . . . substituting step,
S3 . . . passing step,
S4 . . . temporary inserting step,
S5 . . . resubstituting step,
S6 . . . attaching step,
S7 . . . pouring step

The invention claimed is:

1. A beverage server for pouring a beverage stored in an internal space of a bottle to which a cork stopper has been attached, the beverage server comprising:
- a tubular through-screw portion that is attached by boring through the cork stopper;
- a gas supply tube communicating with an inside of the through-screw portion;
- a gas supply device attached to the gas supply tube and configured to supply a food additive gas to the gas supply tube;
- a gate valve attached to the inside of the through-screw portion;
- a tubular pouring portion, inserted in the through-screw portion, that passes through the gate valve; and
- a check valve attached to an inside of the pouring portion, wherein
- the gate valve is configured to be opened by passing the pouring portion through the gate valve and to be closed by pulling the pouring portion out of the gate valve,
- the pouring portion has a beverage supply hole formed at a lower end portion thereof,
- the food additive gas supplied from the gas supply device is supplied from the gas supply tube to the through-screw portion and supplied to the internal space through a space between an outer wall of the pouring portion and an inner wall of the through-screw portion, and
- the food additive gas supplied to the internal space exerts a pressing force that causes the beverage to flow to the inside of the pouring portion through the beverage supply hole, open the check valve, and be poured through an orifice of the pouring portion.

2. The beverage server according to claim 1, wherein
- the gate valve is substantially in a shape of a disk having flexibility,
- the gate valve has a slit portion provided in substantially a center thereof, and
- the gate valve is opened by a gap portion being formed between the pouring portion and the gate valve by passing the pouring portion through the slit portion.

3. The beverage server according to claim 1, wherein the through-screw portion has provided at a lower end portion thereof a notch portion configured to bore through the cork stopper.

4. The beverage server according to claim 1, further comprising a casing portion,
wherein
- the casing portion includes
  - an interconnecting portion to which the gas supply tube and the through-screw portion have been attached, and
  - a housing portion containing the interconnecting portion and the gas supply tube,
- the interconnecting portion includes a hollow portion communicating with an inside of the gas supply tube and the inside of the through-screw portion,
- the housing portion is provided with a connecting port, connected with the gas supply tube, to which the gas supply device is connected, and
- the food additive gas supplied from the gas supply device is supplied to the through-screw portion via the hollow portion from the gas supply tube.

5. The beverage server according to claim 1, wherein
- the through-screw portion is configured to be detachably attached to the casing portion, and
- the housing portion has a lock mechanism that fastens the through-screw portion.

6. A beverage server kit comprising:
- the beverage server according to claim 4;
- a tubular guide portion that is attached to the casing portion instead of the pouring portion in order to bore through the cork stopper in attaching the beverage server to the cork stopper; and
- a cap portion configured to, in interrupting pouring of the beverage, seal the inside of the through-screw portion separated from the casing portion, wherein the cap portion is attachable to and detachable from the through-screw portion, the guide portion is provided with a guide portion check valve, the guide portion has provided at a lower end portion thereof a screw portion configured to bore through the cork stopper, and the guide portion has a gas supply hole provided at the lower end portion.

7. A beverage-pouring method involving use of the beverage server kit according to claim 6, the beverage-pouring method comprising:

a temporary passing step of passing the through-screw portion halfway through the cork stopper by handling the casing portion with the guide portion attached to the casing portion;

a substituting step of substituting air inside the gas supply tube, the through-screw portion, and the guide portion with the food additive gas by supplying the food additive gas from the gas supply device;

a passing step of passing the through-screw portion completely through the cork stopper;

a temporary inserting step of, after detaching the guide portion from the casing portion, inserting the pouring portion into the body portion until a lower end of the pouring portion reaches the hollow portion;

a resubstituting step of substituting air in the pouring portion with the food additive gas by supplying the food additive gas from the gas supply device;

an attaching step of attaching the pouring portion to the casing portion by passing the pouring portion through the gate valve and inserting the pouring portion into the through-screw portion until the beverage supply hole reaches the beverage; and a pouring step of pouring the beverage through the poring portion by supplying the food additive gas from the gas supply device to the internal space via the gas supply tube.

* * * * *